United States Patent
Van As et al.

(10) Patent No.: US 8,944,650 B2
(45) Date of Patent: Feb. 3, 2015

(54) VEHICLE LAMP, A METHOD OF ADJUSTING A VEHICLE LAMP, AND A VEHICLE WITH A VEHICLE LAMP

(75) Inventors: Marco Van As, Eindhoven (NL); Ralph Hubert Peters, Maastricht (NL)

(73) Assignee: Koninklijke Philips N.V., Eindhoven (NL)

( * ) Notice: Subject to any disclaimer, the term of this patent is extended or adjusted under 35 U.S.C. 154(b) by 1204 days.

(21) Appl. No.: 12/441,588

(22) PCT Filed: Sep. 17, 2007

(86) PCT No.: PCT/IB2007/053731
§ 371 (c)(1), (2), (4) Date: Mar. 17, 2009

(87) PCT Pub. No.: WO2008/035267
PCT Pub. Date: Mar. 27, 2008

(65) Prior Publication Data
US 2009/0323369 A1    Dec. 31, 2009

(30) Foreign Application Priority Data

Sep. 21, 2006   (EP) .................................... 06121032

(51) Int. Cl.
*F21S 8/10*   (2006.01)
*B60Q 1/08*   (2006.01)
*F21Y 101/02* (2006.01)

(52) U.S. Cl.
CPC ............ B60Q 1/085 (2013.01); F21S 48/1145 (2013.01); F21S 48/1731 (2013.01); F21S 48/1757 (2013.01); *F21Y 2101/02* (2013.01)
USPC ........................................ 362/514; 362/465

(58) Field of Classification Search
USPC .......................... 362/514, 517, 465–468, 583
See application file for complete search history.

(56) References Cited

U.S. PATENT DOCUMENTS

| | | | |
|---|---|---|---|
| 4,733,333 A | 3/1988 | Shibata et al. | |
| 4,985,816 A | 1/1991 | Seko et al. | |
| 5,060,120 A | 10/1991 | Kobayashi et al. | |
| 5,798,911 A * | 8/1998 | Josic | 362/466 |
| 5,988,837 A * | 11/1999 | Eichhorn et al. | 362/464 |
| 6,059,435 A | 5/2000 | Hamm et al. | |
| 6,626,565 B2 * | 9/2003 | Ishida | 362/514 |
| 6,953,274 B2 * | 10/2005 | Rice | 362/526 |
| 7,270,449 B2 * | 9/2007 | Uke | 362/350 |

(Continued)

FOREIGN PATENT DOCUMENTS

| | | |
|---|---|---|
| DE | 4418135 A1 | 11/1995 |
| DE | 10260397 A1 | 7/2004 |

(Continued)

*Primary Examiner* — Jong-Suk (James) Lee
*Assistant Examiner* — Leah S Macchiarolo
(74) *Attorney, Agent, or Firm* — Yuliya Mathis

(57) ABSTRACT

The invention provides a lamp with adjustable beam cut-off, useful for e.g. vehicle headlamps. The lamp comprises a solid-state light source 1 and a reflector 2, as well as a movable beam limiter 3. To adjust the cut-off, the beam limiter 3 may be moved by an actuator 4. An advantage is that the beam limiter 3 reflects incident light into the emitted beam instead of absorbing it, which increases efficiency. Furthermore, because the reflector 2 and also the beam limiter 3 may be positioned very close to the light source, which may be a LED or a laser diode, they may be flat and very small. Both circumstances ensure that the beam cut-off may be adjusted very quickly.

18 Claims, 2 Drawing Sheets

(56) References Cited

U.S. PATENT DOCUMENTS

| | | | |
|---|---|---|---|
| 7,357,545 B2 * | 4/2008 | Stefka et al. | 362/539 |
| 7,478,934 B2 * | 1/2009 | Lee | 362/538 |
| 7,607,811 B2 * | 10/2009 | Okada | 362/545 |
| 2004/0240217 A1 | 12/2004 | Rice | |
| 2004/0263346 A1 | 12/2004 | Neal | |
| 2005/0128764 A1 | 6/2005 | Enders | |
| 2006/0023461 A1 | 2/2006 | Knight | |
| 2006/0044818 A1 * | 3/2006 | Amagasa | 362/514 |
| 2008/0055918 A1 * | 3/2008 | Mascadri | 362/475 |

FOREIGN PATENT DOCUMENTS

| | | |
|---|---|---|
| DE | 10344173 A1 | 4/2005 |
| DE | 102004051485 A1 | 6/2005 |
| EP | 1298387 A2 | 4/2003 |
| GB | 2211923 A | 7/1989 |
| JP | 63008037 A | 1/1988 |

* cited by examiner

VEHICLE LAMP, A METHOD OF ADJUSTING A VEHICLE LAMP, AND A VEHICLE WITH A VEHICLE LAMP

FIELD OF THE INVENTION

The present invention relates, in a first aspect, to a vehicle lamp, in a second aspect to a method of adjusting such a vehicle lamp, and in a third aspect to a vehicle provided with such a vehicle lamp.

In particular, the present invention relates in a first aspect to a vehicle lamp, comprising a solid-state light source, a collimating reflector, operably positioned with respect to the light source to form a light beam emanating from the light source, an adjustable beam limiter, operable to limit a solid angle of the light beam in at least one direction, an actuator to adjust the beam limiter, and a projection lens, positioned in a path of the light beam.

BACKGROUND OF THE INVENTION

Document U.S. Pat. No. 4,985,816 discloses a vehicle headlamp with a bulb in a reflector, in which two LCD matrices are positioned and which is terminated by a lens. The LCD matrices are used as shading devices, in that they are controllable to absorb desired parts of a light beam to be emitted by the headlamp. Furthermore, the headlamp may comprise a pivotable shading member, with a similar function.

A disadvantage of the known vehicle lamp is that it has a limited and variable efficiency, in that a varying, but relatively large part of the light is absorbed by the shading member(s).

In the near future, vehicle lighting that use headlamps with different settings for different conditions, often referred to as 'Adaptive Frontlighting System' or AFS, will be allowed. It is noted that there are regulations for beams and other properties of vehicle lamps, both in general and for AFS in particular. With the current available technology, creating these different settings is only possible with multiple reflector/lamp combinations and rotatable lamp-reflector combinations. Obviously this is expensive and bulky.

OBJECT OF THE INVENTION

It is hence an object of the present invention to provide a vehicle lamp of the kind mentioned in the preamble, with improved efficiency.

Another object of the invention is to provide a vehicle lamp with improved functionality to comply with the AFS regulations.

SUMMARY OF THE INVENTION

At least one of the above objects is achieved with a vehicle lamp according to claim 1, comprising a solid-state light source, a collimating reflector, operably positioned with respect to the light source to form a light beam emanating from the light source, an adjustable beam limiter, operable to limit a solid angle of the light beam in at least one direction, an actuator to adjust the beam limiter, and a projection lens, positioned in a path of the light beam, wherein the adjustable beam limiter comprises a movable reflector, that is movable with respect to the collimating reflector and is positioned to reflect light from the light source into the light beam towards the projection lens.

By providing a beam limiter that reflects the part of the beam that is outside the desired beam solid angle back into the beam, the overall efficiency may be improved, and at least kept constant to a higher degree. Note that the projection lens could be positioned such that the exit window of the collimator is imaged on the road, and the beam limiter is positioned such that the upper beam cut-off on the road can be manipulated.

In an embodiment, the beam limiter can be fixed in at least two positions. This embodiment is advantageous in e.g. vehicle headlamps, in which preferably more than one beam shape is present. For example, well-known examples of such multi-function headlamp is a headlamp with a 'headlights' and 'dipped headlights' functionality. Such a multi-functionality is also conceivable for other vehicle lamps, such as rear lamps with a 'normal' and 'fog lamp' functionality.

In particular, the beam limiter can be fixed in at least three positions. This further improves the applicability of the vehicle lamp, and offers the possibility of more compact lighting on vehicles, in that fewer lamps are needed. For example, it is possible to include 'headlights', 'dipped headlights' and 'fog lamp' functionality in one lamp by provided three suitable positions for fixing the beam limiter. Vehicle lighting that uses headlamps with different settings is often referred to as 'Adaptive Frontlighting System' or AFS.

It is noted that there are regulations for beams and other properties of vehicle lamps, both in general and for AFS in particular. The skilled person will easily apply the present invention within the framework of these regulations, where required.

In a special embodiment, the beam limiter is continuously adjustable. This may be advantageous e.g. in the case of a vehicle that is loaded in an unbalanced fashion. Normally, this could cause the beams of light to be misaligned. Now, however, this misalignment may be corrected by limiting the beam, in particular in the direction, i.e. part of the solid angle that could cause dazzling of other traffic or would otherwise be outside the regulations.

In particular, the solid-state light source comprises at least one LED or laser diode. In particular these solid-state light sources offer the possibility of relatively intense light and a small emitting surface, but in particular also the possibility of providing the collimating reflector very close to the emitting surface, i.e. to the actual source of the light. In other light sources, such as filament or discharge lamps, this is not possible, which more or less limits the collimating reflectors to elliptic or parabolic reflectors. The consequences of this difference will be further elucidated below.

In an embodiment, the at least one LED comprises a LED or group of LEDs, operable to emit white light. In most countries, white light is required to be emitted as the main vehicle lighting, although exceptions exist, such as yellow main lighting. Of course, such other colors are also possible with the present invention, and also with a suitable combination of other solid-state light sources, such as laser diodes.

In the case of the small solid-state light sources mentioned above, where the collimating reflector is actually positioned close to, and preferably adjacent a light emitting surface, the collimating reflector nor the beam limiter need to have a clearly elliptic or parabolic shape in order to collimate the emitted light into a useful beam. In particular, the solid-state light source comprises at least two light sources, emitting different light beams into different solid angles, and the beam limiter is substantially flat. Even with this simplest possible shape, the beam limiter serves its function well. It is noted that a desired beam shape, i.e. with a relatively low cut-off above the surface of the road, and a higher beam above the roadside, is achievable with a flat beam limiter if a number of different sources is used. These sources may be placed in such positions with respect to the beam limiter that the desired beam is obtained. In such case, the partial exit beams of each of the individual light sources (or modules) may be made expediently narrow or wide.

Alternatively, the solid-state light source comprises one or more light sources, in particular at least one LED module, emitting substantially into the same solid angle, and the beam limiter has a cross-sectional shape which is substantially a mirror image of a desired beam cut-off of the beam. In this case, a single light source (or module) is used and the beam limiter shape is adapted accordingly. This is simpler and thus preferable, but requires a light source with a higher brightness. In this case, a still very simple way to achieve the desired beam is with a beam limiter with a shape consisting of two substantially flat faces that are connected along a substantially horizontal line that extends in forward direction, wherein one face is substantially horizontal and the other face forms a downward angle. Because of the two flat faces, this beam limiter is still called "flat" in the context of this application. Still other shapes, such as with curved surfaces, are not excluded.

A great advantage of the flat beam limiter is that the collimating properties of the collimating reflector as a whole, i.e. including the beam limiter, are not affected very much by moving the beam limiter. In contrast, in cases where the collimating reflector and the beam limiter are of a parabolic or elliptic shape, such as with bulbs of filament or discharge lamps, moving the beam limiter, or any other part of the collimating reflector, would often decrease the beam shaping quality thereof, depending on the design. However, if this efficiency loss is acceptable, the other advantages of the invention, such as quickness of adjusting the lamp, are still obtainable with non-flat parts.

In an embodiment, the beam limiter is tiltable around an axis that occurs near the light source, preferably adjacent the light source, and wherein the axis is preferably at an end of the beam limiter nearest to the light source and preferably adjacent the light source. Especially in, but not limited to, the case of the flat beam limiter, the beam limiter may expediently be embodied as rotatable around an axis, in particular as described above. Alternatively or in addition, other ways of moving the beam limiter, such as simple shifting in position, are not excluded, although rotating is advantageous when limiting (solid) angles, such as for dipped headlights.

In an embodiment, the beam limiter forms a part of the collimating reflector. In particular, the beam limiter is part of an external wall of the collimating reflector. Since the beam limiter reflects radiation, there is no need for the collimating reflector to extend on the other side of the reflecting surface of the beam limiter. Nevertheless, the beam limiter may also be a separate part within the collimating reflector. In either case, it is advantageous to position the beam limiter in a position of an extreme (solid) angle, such that the beam limiter indeed limits the beam in the required direction.

In an embodiment, the collimating reflector comprises four segments, in particular four substantially flat faces. As already mentioned, the lower segment, that may serve the purpose of a beam limiter, may be composed of (at least) two flat faces that form an angle with each other. In each case, the total collimating reflector becomes more or less a pyramid. This embodiment expediently uses the circumstance that the segments need not be ellipsoid or paraboloid, but may be more or less flat, or even substantially flat. This greatly reduces production efforts, and offers the possibility of adapting the beam pattern in two perpendicular directions. The upper and lower segment may, however, be curved. The upper part may e.g. be curved in two directions. The lower part is preferably curved in only one direction to make a straight cut-off in the beam.

In a special embodiment, the vehicle lamp according to the invention further comprises an actuator control to control the actuator. Although such an actuator control is not absolutely necessary, providing such a control makes operating the vehicle lamp more comfortable, especially if the actuator control is remotely controllable. An actuator control may be coupled e.g. to a switch on a dashboard or the like.

In an expedient embodiment, the actuator control is operably connected to at least a sensor that is able to detect tilt and a sensor that is able to detect vertical acceleration. This provides the possibility of correcting the beam in response to a measured deviation of e.g. the position or trajectory of a vehicle on which the lamp is mounted. Such deviations may e.g. be caused by bumps, speed ramps etc. in the road, or by acceleration or deceleration of the vehicle. By measuring the associated tilt and/or vertical acceleration, the actuator may correct any misalignment caused thereby.

At this point, it is noted that one of the main advantages of the present invention is that it makes a step of using a small, movable reflector part, i.e. the beam limiter. Such a beam limiter may be used with small solid-state light sources, and offers great advantages, in that it becomes possible to minimize the size of the part that is adjusted. This in turn offers the possibility of an increased speed of adjustment and an increased versatility. This holds for most, if not all embodiments of the invention. In contrast, in known adjustable headlamps, all of the collimating reflector, or even the complete headlamp is adjusted, which is a much greater mass to adjust, which is inherently slower.

In an embodiment, the actuator comprises a stepping motor, the beam limiter being operably connected to the stepping motor. A sophisticated actuator is not required, in particular not for embodiments in which the beam limiter can be fixed in at most two positions. For such embodiments, a simple spring with a reset mechanism would suffice. However, in case of three or more positions that can be fixed, an actuator with feedback is more preferable, if not required. Such actuator is not limited to a stepping motor, and may also comprise piezoelectric devices, Lorenz actuators and so on. However, a stepping motor has an advantage that it does not require (external) feedback to adjust the beam limiter. Just counting the number of steps from a known starting position is enough to know the exact position. In practice, the stepping motor may be coupled directly to the beam limiter or via a transmission, or, advantageously, through a spindle which can be rotated by the stepping motor. By rotating the stepping motor, a nut on the spindle is displaced e.g. horizontally, and may then cause swiveling or rotation of the beam limiter. Other suitable coupling mechanisms to move the beam limiter with the stepping motor, or some other expedient actuator, are easily conceivable by the skilled person.

In an advantageous embodiment, the vehicle lamp further comprises a horizontal beam adjuster. It is noted that in the text up to now, the term 'vertical' has related to the vertical sense in use of the vehicle lamp. Further to adjustments in said vertical direction, it may also be advantageous to be able to adjust the vehicle lamp in the horizontal direction, such as for fog lamp functionality, which often requires not only a low beam, but also a wider beam. The AFS regulations also prescribe beam broadening in certain cases. To accomplish such functionality, it is e.g. possible to provide an additional beam limiter in the vehicle lamp. In a first position, such as a normal position, this additional beam limiter may be positioned such that it actually limits the beam in the horizontal direction to the required 'narrow' beam, while in a second position, the beam limiter is moved such that it limits less, and the beam is thus widened.

In another embodiment, the horizontal beam adjuster comprises at least one, and preferably two, vertical segments of the collimating reflector. Preferably, this embodiment relates to a vehicle lamp in which the collimating reflector comprises flat or substantially flat movable segments. These may be rotatable or the like, to adjust the horizontal beam width. Note, however, that in this embodiment, and in particular if combined with a beam limiter in vertical direction, light leakage may occur through gaps between the movable segment and adjacent segments.

In particular, the horizontal beam adjuster comprises a controllable optical device that is operable to adjustably adjust the beam substantially in horizontal direction. Such an optical device, preferably a separate device, offers a very quick and well controllable device.

Preferably, the optical device is one of an electrowetting element or anisotropical liquid crystal device. Electrowetting elements make use of a phenomenon in which the meniscus between two fluids may be adjusted by applying a voltage across a surface by which the fluids are contained. In particular, the wettability of said surface is influenced by the changing meniscus implying changed optical properties, in particular an adjustable lens power. By providing one or more voltages, preferably between parallel and alternating positive and negative electrodes, one or more adjustable cylinder lenses may be provided, by which the beam width may be adjusted. This may be done very rapidly, and with a high degree of precision. As an alternative, an anisotropical liquid crystal device offers the same functionality, with a similar electrode arrangement and similar voltages. These cause changes in the refractive index of the liquid crystal material, which hence may influence the optical power thereof. In this way, similar adjustable cylinder lenses may be provided, for similarly quick and well-controlled beam widening.

Preferably, the optical device, and in particular the anisotropical liquid crystal device, is positioned at the side of the projection lens facing away from the light source. This ensures the possibility of providing collimated light to the optical device, which ensures optimum efficiency, to control both optical properties and energy efficiency, since the beam remains equally wide for every beam width. Note that in the prior art document U.S. Pat. No. 4,985,816, the liquid crystal matrix is positioned before the lens. An electrowetting device is less sensitive to the degree of collimation of the beam and can thus be placed also before the projecting lens with less decrease in functionality.

In an embodiment, the collimating reflector can be adjustably positioned, preferably continuously adjustably positioned. Although, as mentioned before, it is advantageous that the beam limiter is small and quickly adjustable, it may still be preferable if the complete collimating reflector is adjustable, e.g. in order to correct for unequal load of the vehicle or the like. For such changes generally need correction only once during each use.

In a second aspect, the invention relates to a method of adjusting a collimating reflector in a vehicle lamp according to the invention, wherein the actuator comprises a stepping motor, the beam limiter being operably connected to the stepping motor, the method comprising the steps of operating the light source to emit a light beam, determining a deviation from the emitted light beam and a reference and adjusting the collimating reflector by operating the actuator until the deviation is below a predetermined limit. This method uses embodiments in which there is provided a stepping motor connected to a spindle and rotatable shaft or the like. In particular, the stepping motor is operably connected to the collimating reflector, since it is the general beam properties that are desired to be influenced by the present method. This method is e.g. advantageous during production of the vehicle lamp as a quality control step, in which the lamp is adjusted to conformity with specifications of the manufacturer.

In a third aspect, the invention also provides a vehicle provided with at least one vehicle lamp according to the invention. A vehicle with such a lamp, and of course in particular with at least two headlamps, will have advantages as already described, relating to speed of adjustment of the beam position, while the compact construction that is possible with the invention provides more degrees of freedom of design.

DETAILED DESCRIPTION OF EXAMPLES

The embodiments shown in the Figures and described below are only examples given to help understand the invention, and should not be construed as limiting the invention in any way.

Figure 1:
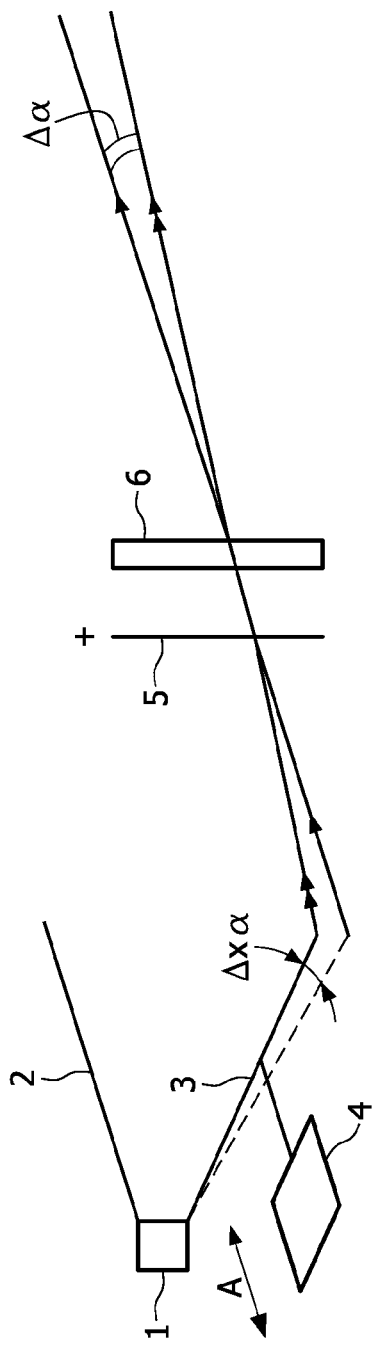
FIG. 1 very diagrammatically shows a vehicle lamp according to an embodiment of the present invention, in a cross-sectional view.
Figure 3:
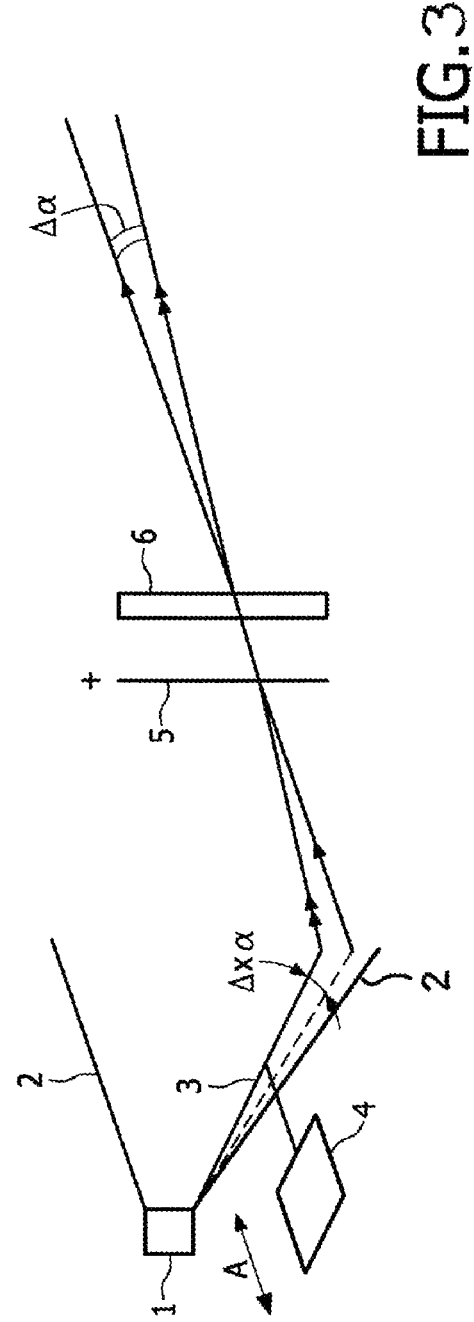
FIG. 3 very diagrammatically shows a vehicle lamp according to another embodiment of the present invention, in a cross-sectional view.

FIG. 1 and FIG. 3 very diagrammatically show a vehicle lamp according to embodiments of the present invention, in a cross-sectional view. FIG. 1 and FIG. 3 are not drawn to scale.

The vehicle lamp comprises a light source 1, a collimating reflector 2, a beam limiter 3, an actuator 4, a projection lens 5 and optionally a Liquid Crystal (LC) optical device 6.

The light source 1 comprises a white light LED combination, although any other color, or e.g. a laser diode is also possible. The light emitting surface of a solid-state light source as used here, may be made very small, e.g. only a few $mm^2$, and may or may not be provided with a small LED lens.

The collimating reflector 2, of which only one part or segment is shown here, can be seen to be positioned very close to the light source. Hence its shape may comprise flat faces, shown in FIG. 1 as the upper segment of the collimating reflector 2 and also the co-operating beam limiter 3. The two vertical parts are not shown in the drawings, but serve to form a reflecting surface substantially around the light-emitting surface of the light source. It is noted that one of the vertical segments, or both, could also be made movable, in order to vary the horizontal extent of the beam. Similar actuators could be provided. It is then preferable if the beam limiter 3 is a separate part within an otherwise completely circumferential collimating reflector 2, as shown in FIG. 3, to prevent light leakage. In other words, below beam limiter 3, there is another, bottom horizontal segment of the collimating reflector 2. This is a constructional simplification, as it allows more production processes for the collimating reflector 2. However, it is to be noted that care should be taken that no light hits the road above the cut-off, in order to better define the beam, and/or to conform to regulations. The presence of a mirror below the beam limiter mirror would normally allow light to be present above the cut-off, which is unwanted. Hence, light leakage around the beam limiter towards the bottom 'mirror' should be prevented, such as by closely fitting parts, or by blackening the inside of the bottom 'mirror'. It will be obvious that, from a beam optical point of view, a collimating mirror without a bottom mirror but with the beam limiter would be preferred.

In FIG. 1 and FIG. 3, the beam limiter 3 is a movable reflector element, actuatable by an actuator 4, which in turn may be controlled by an actuator control, which is not shown here. The actuator 4 may extend in the direction of the arrow A, which causes the beam limiter 3 to swivel at a certain angle, indicated as $\Delta x$. In FIG. 1 and FIG. 3, the beam limiter 3 is shown in two positions, one in a solid line and one in a dashed line. These positions may e.g. be fixed positions, such as for dipped headlight and headlights, respectively, or may be positions in a continuous range.

Also drawn is a limiting ray of the beam for each of the two positions, with a double arrow, and a single arrow, respectively. After having passed the projection lens 5, which has a focal length f, the swivel over $\Delta x$ corresponds to a change in the angle of $\Delta \alpha$ of the beam exiting the lens 5. In a practical example, $\Delta \alpha = 0.5°$, and f=40 mm. With basic maths, this gives for $\Delta x = 0.35$ mm. Of course, different angles and lenses give different displacements, but the bottom line in most cases will be that this displacement $\Delta x$ will be very small. Also note that in a similar practical case, the dimensions of the collimating reflector 2 and/or the beam limiter 3 are also very small, e.g. 5-10 mm deep, and about 5×6 mm, respectively, although other sizes are not excluded. With such small dimensions, and hence small masses, and also small displacements, adjustments can be carried out with high speed.

To carry out the adjustments, actuator 4 is provided, such as piezo-electrical device, or preferably a stepping motor. This will be elucidated below.

The optional LC (liquid crystal) optical device 6 may also be e.g. an electrowetting device, in either case with switchable beam widening properties. A great advantage of such devices is that the beam widening may be limited to one direction, in particular the horizontal direction, while the vertical direction is not, or only to a very limited extent, affected by it. Both optical devices work by providing liquid cylinder lenses that may be turned 'on' and 'off'. The optical device 6 is positioned behind the lens 5, i.e. with an optimum beam collimation, for optimum optical performance.

Figure 2:
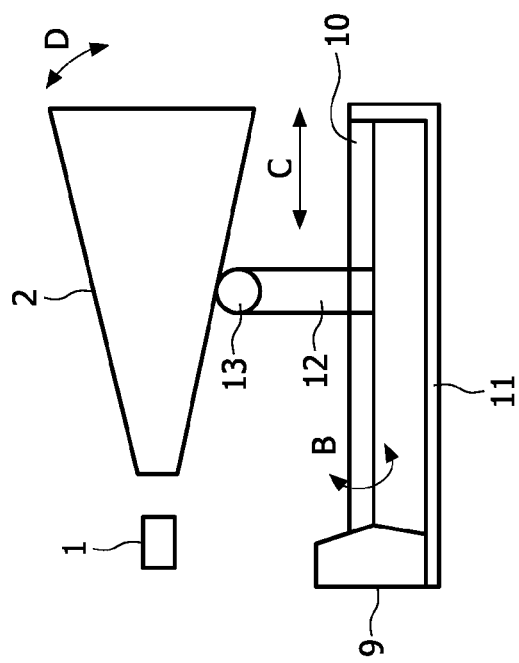
FIG. 2 shows a method and a lamp according to the present invention, diagrammatically and in side elevational view.

FIG. 2 shows a method and a lamp according to the present invention, diagrammatically and in side elevational view. Similar parts are denoted by the same reference numerals. Thus, the lamp comprises a LED 1 and a reflector 2. An actuator assembly for adjusting the lamp comprises e.g. a stepping motor 9, a spindle shaft 10, a base 11, an actuator rod 12 and an actuator head 13.

The base 11 serves to hold the spindle shaft 10 and the stepping motor 9 in position with respect to each other. The stepping motor is able to rotate in the direction of arrow B, which causes actuator rod 12 to move along the spindle shaft 10 in the direction of arrow C. This in turn causes actuator head 13 to move along the reflector 2, which causes the latter to swivel or tilt in the direction of arrow D.

Operating the above lamp may serve various objects. E.g., when setting the standard specifications of the lamp, i.e. the reflector 2 with respect to the LED 1, such that a horizontal beam exits the lamp, the lamp may be mounted in a test fixture, and lit. The emitted beam may be examined, and if correction is desired, the stepping motor may be operated, such that the direction of the emitted beam is corrected. This may help to account for and correct the spread in properties of the LED 1 and the reflector 2 at production. It is advantageous to position the reflector 2 correctly with respect to the LED. Note that this may be used in a vehicle lamp according to the invention, but also as a separate test set up at e.g. a factory. There, the combination of LED and reflector may be assembled (temporarily or permanently), and mounted in the test fixture comprising the parts 9 through 13 as described above. The inventive method may be carried out, and the LED-reflector combination may be set.

Alternatively, the method and the corresponding lamp may be used in e.g. a vehicle, where correction of the beam direction is required, e.g. due to unbalanced loading of the vehicle. In such a case, the driver may operate the stepping motor until the beam direction satisfies his desires. Alternatively, according to an embodiment of the invention, a sensor (not shown) may be provided that measures tilt and/or vertical acceleration, which are a measure for a deviation from the horizontal of the beam direction. By operably coupling the stepping motor to the sensor, automatic correction of the general beam direction becomes possible.

Alternatively, such setting or automatic correction may also be carried out for just the upper part of the emitted beam, by letting the actuator assembly of FIG. 2 work not on the total reflector 2, but just on a bottom reflector, such as shown in FIG. 1 and FIG. 3. In that case, the upper beam cut-off is set, instead of the full beam direction.

The embodiments shown and described are non-limiting examples of the invention, while the full scope of the invention is to be determined by means of the appended claims.

The invention claimed is:

1. A vehicle lamp, comprising:
a solid-state light source;
a circumferential collimating reflector, operably positioned with respect to the light source to form a light beam emanating from the light source;
an adjustable beam limiter within the circumferential collimating reflector, operable to limit a solid angle of the light beam in at least one direction;
an actuator to adjust the beam limiter; and
a projection lens, positioned in a path of the light beam;
wherein the adjustable beam limiter comprises a movable reflector, that is movable with respect to the circumferential collimating reflector and is positioned to reflect light from the light source into the light beam towards the projection lens.

2. The vehicle lamp of claim 1, wherein the beam limiter can be fixed in at least two positions.

3. The vehicle lamp of claim 1, wherein the beam limiter can be fixed in at least three positions.

4. The vehicle lamp of claim 1, wherein the beam limiter is continuously adjustable.

5. The vehicle lamp of claim 1, wherein the solid-state light source comprises at least one LED or laser diode.

6. The vehicle lamp of claim 5, wherein the at least one LED comprises a LED or group of LEDs, operable to emit white light.

7. The vehicle lamp of claim 5, wherein the solid-state light source comprises at least two light sources, and wherein the beam limiter is substantially flat.

8. The vehicle lamp of claim 1, wherein the beam limiter is tiltable around an axis that is positioned adjacent the light source.

9. The vehicle lamp of claim 1, wherein the circumferential collimating reflector comprises four segments having flat faces, respectively.

10. The vehicle lamp of a claim 1, further comprising an actuator control to control the actuator.

11. The vehicle lamp of claim 1, wherein the actuator comprises a stepping motor, the beam limiter being operably connected to the stepping motor.

12. The vehicle lamp of claim 1, wherein the circumferential collimating reflector can be adjustably positioned continuously.

13. A vehicle provided with at least one vehicle lamp according to claim 1.

14. A vehicle lamp, comprising:
a solid-state light source;
a collimating reflector, operably positioned with respect to the light source to form a light beam emanating from the light source;
an adjustable beam limiter, operable to limit a solid angle of the light beam in at least one direction;
an actuator to adjust the beam limiter under control of an actuator control; and
a projection lens, positioned in a path of the light beam;
wherein the adjustable beam limiter comprises a movable reflector that is movable with respect to the collimating reflector and is positioned to reflect light from the light source into the light beam towards the projection lens, and
wherein the actuator control is operably connected to a sensor configured to detect tilt and vertical acceleration, and adjusts the adjustable beam limiter, based on at least one of the detected tilt and vertical acceleration, to correct misalignment.

15. A vehicle lamp, comprising:
a solid-state light source;
a collimating reflector, operably positioned with respect to the light source to form a light beam emanating from the light source;
an adjustable beam limiter, operable to limit a solid angle of the light beam in a vertical direction;
an actuator configured to adjust the beam limiter;
a projection lens, positioned in a path of the light beam; and
a horizontal beam adjuster configured to adjust the solid angle of the light beam in a horizontal direction,
wherein the adjustable beam limiter comprises a movable reflector that is movable with respect to the collimating reflector and is positioned to reflect light from the light source into the light beam towards the projection lens.

16. The vehicle lamp of claim 15, wherein the horizontal beam adjuster comprises at least one vertical segment of the collimating reflector.

17. The vehicle lamp of claim 15, wherein the horizontal beam adjuster comprises a controllable optical device that is operable to adjustably adjust the beam substantially in the horizontal direction.

18. The vehicle lamp of claim 17, wherein the optical device is one of an electrowetting element or anisotropical liquid crystal device.

* * * * *